Oct. 22, 1974   S. F. DRESEN ET AL   3,843,523
OIL FILTER
Filed May 24, 1972   2 Sheets-Sheet 1
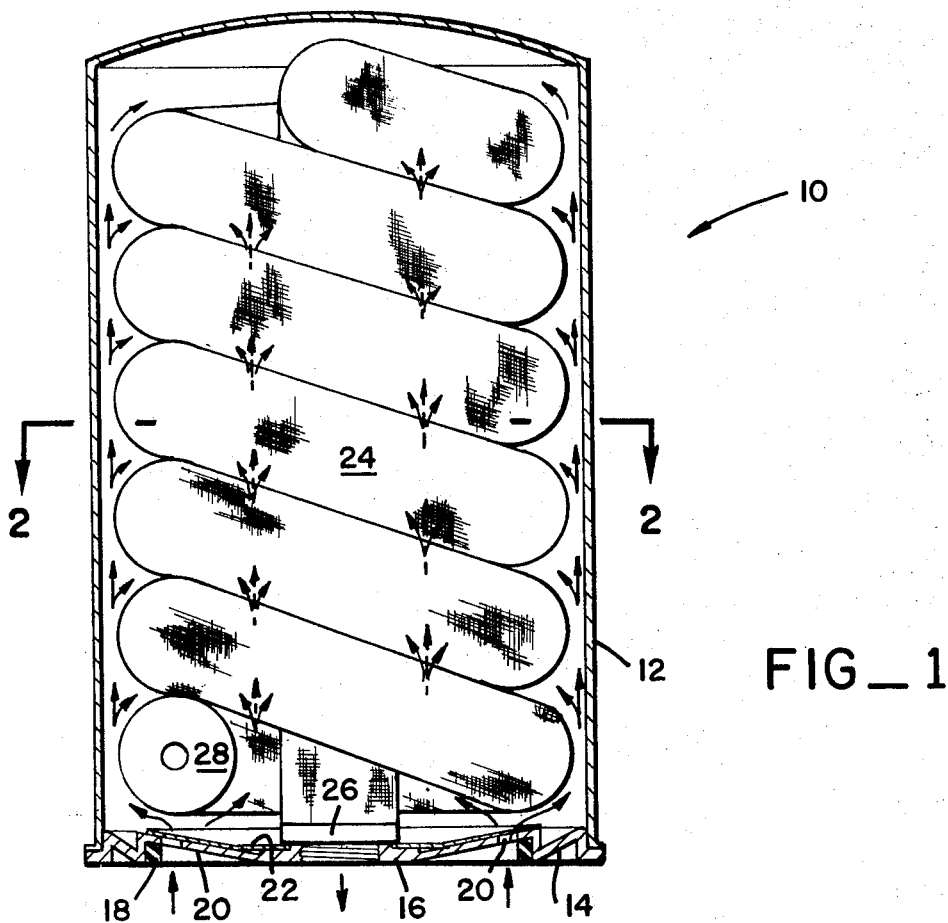
FIG_1
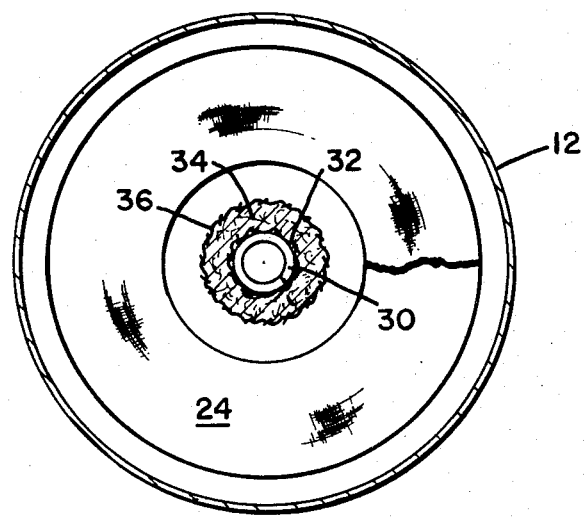
FIG_2

Oct. 22, 1974   S. F. DRESEN ET AL   3,843,523
OIL FILTER
Filed May 24, 1972   2 Sheets-Sheet 2
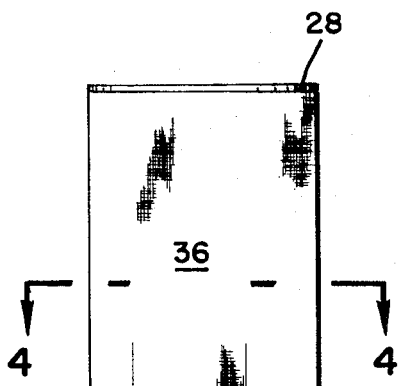
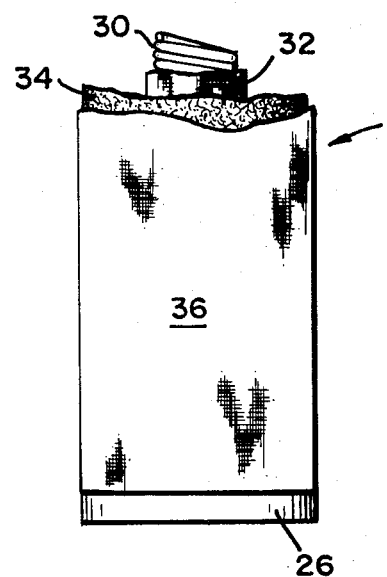
FIG_3
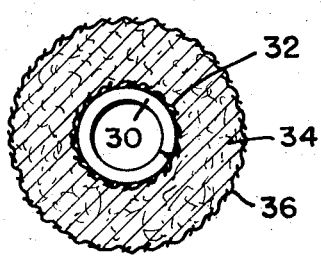
FIG_4
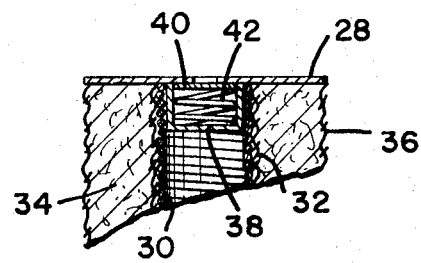
FIG_5
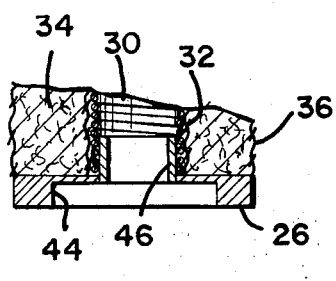
FIG_6

United States Patent Office 3,843,523
Patented Oct. 22, 1974

3,843,523
OIL FILTER
Stanley F. Dresen and Reuben E. Anderson, San Ramon, Calif., assignors to Stanley F. Dresen, doing business as SFD Oil Filters, San Ramon, Calif.
Filed May 24, 1972, Ser. No. 256,526
Int. Cl. B01d 27/00
U.S. Cl. 210—440
9 Claims

ABSTRACT OF THE DISCLOSURE

A filter, typically employed as an oil filter for automotive internal combustion engines, having a housing in which an elongate filtering element is disposed, the filtering element defining a tortuous path within the housing. Preferably, the filtering element comprises a flexible tube surrounded by a migration barrier. The primary filtering medium, preferably fibrous cotton, is disposed about the migration barrier and an outer cloth cover encompasses the primary filtering medium and functions as an additional filtering medium. Preferably, the path of the filtering element within the housing comprises a spiral, to substantially maximize the length of filtering element which may be contained in the housing.

---

This invention relates to filters, and more particularly, to oil filters typically employed with automotive internal combustion engines.

In most automotive internal combustion engines, an oil filter is provided to remove deleterious contaminants from the oil during operation. One type of oil filter is the so-called "spin-on full-flow" type which generally comprises a cylindrical can or housing having a threaded opening at one end for engagement with the engine. Interior of the housing is a filter element which generally comprises a cylindrical element having a diameter slightly smaller than the diameter of the housing and a length somewhat shorter than the length of the housing. Thus, heretofore, the size and shape of the filtering element has been significantly limited by the dimensions of the housing. Since the filtering efficiency and capacity of the filter depends to a large extent upon the dimensions thereof, prior art oil filters have thus been significantly limited in this regard.

Improvements in the oil filters for automotive internal combustion engines generally require that the external configuration of the oil filter housing remain substantially unchanged, due to mounting and space limitations in existing automobiles. Accordingly, the present invention provides filter which may readily be embodied as a "spin-on full-flow" type oil filter having an external housing or configuration substantially identical to prior art oil filters. However, the oil filter according to the present invention employs an elongate filtering element having a length substantially greater than the length of the housing, disposed within the housing along a tortuous path. Preferably, the filtering element comprises a flexible foraminous tube wrapped with a migration barrier such as cloth. A substantial layer of the principal filtering medium, preferably fibrous cotton, is disposed about the migration barrier and a fabric outer cover is provided about the principal filtering medium to provide the integrity of the filtering element and to provide an additional filtering medium. The tortuous path of the filtering element preferably comprises a generally spiral configuration, so that the entire interior of the housing will be substantially filled by the filtering element. Thus, the size, and therefore the capacity, of the filtering element according to the present invention may substantially exceed prior art filters. Moreover, by directing the filtering element along a tortuous path, the size and shape limitations previously imposed upon the filtering element are overcome.

Accordingly, it is an object of the present invention to provide an oil filter for automoative internal combustion engines having an elongate filtering element disposed along a tortuous path within the oil filter housing.

Another object of the present invention is to provide an oil filter for automotive internal combustion engines in which the size and shape of the filtering element is not substantially limited by the size and shape of the housing.

Still another object of the present invention is to provide an oil filter for automotive internal combustion engines employing a multi-density filtering media having an outer cover such as cloth, an inner core of fibrous cotton and a migration barrier, again preferably of cloth.

Yet another object of the present invention is to provide an oil filter for automotive internal combustion engines having greater filtering efficiency and capacity than prior art oil filters.

The oil filter according to the present invention is advantageous in that by directing the filtering element along a tortuous path, the size and shape of the filtering element will be less limited than prior art filters, so that the configuration of the filtering element may be optimized with less regard for the dimensions of the oil filter housing. Moreover, the tortuous path enables the provision of a larger filtering element within the conventionally-shaped housing, thereby resulting in an increase in filtering efficiency and capacity.

These and other objects, features and advantages of the present invention will be more readily apparent from the following detailed description of the preferred embodiment of the present invention wherein reference is made to the accompanying drawings, in which:

FIG. 1 is a side view, partially in cross-section, of an oil filter according to the present invention;

FIG. 2 is a sectional view taken along the line 2—2 in FIG. 1;

FIG. 3 is a side view, partially broken-away, of the filter element according to the present invention;

FIG. 4 is a sectional view taken along the line 4—4 in FIG. 3;

FIG. 5 is a side cross-sectional view of one end of the filtering element depicted in FIG. 3; and FIG. 6 is a side cross-sectional view of the other end of the filter element depicted in FIG. 3.

Referring now to the drawings, there is shown an oil filter 10 according to the preferred embodiment of the present invention. Oil filter 10 generally comprises an elongate generally cylindrical housing 12 having an integral end wall. The other end of housing 12 is closed by an end disk 14 which includes oil inlet and outlet passages.

Specifically, end disk 14 includes a central tubular fitting 16 having an internally threaded outwardly extending portion for engagement on the engine with which the oil filter 10 is employed. As will be more readily apparent hereinafter, tubular fitting 16 functions as the oil outlet passage for the oil filter 10.

End disk 14 further includes an annular groove containing a resilient seal 18. When tubular fitting 16 is threadably engaged upon the engine, seal 18 is urged into oil containing pressure engagement with the engine. Thus, seal 18 and tubular fitting 16 cooperate to define an oil inlet region therebetween. To this end, the region of end disk 14 radially between tubular 16 and seal 18 includes a plurality of inlet openings 20 which communicate with the interior of housing 12. Thus, oil is inletted into filter 10 through holes 20 and is outletted through tubular fitting 16.

End disk 14 is typically crimped at its perimeter to housing 12 to define an oil tight enclosure having the inlets and outlets thus described. In accordance with conventional oil filter construction, end disk 14 includes an anti-back flow valve to prevent oil from exiting through inlet passages 20. To this end, a flexible disk 22, typically made of rubber or the like, is mounted on tubular fitting 16 interior of the housing 12. Disk 22 generally abuts against the inner surface of end disk 14 in the region including inlet passages 20. Oil entering the filter 10 through inlet passages 20 readily deflects the flexible disk 22, thereby permitting the desired entry of oil into the filter 10. However, oil attempting to exit through inlet passages 20 urges flexible disk 22 into sealing engagement with holes 20, thereby prohibiting the outflow of oil through inlet passages 20. Thus, flexible disk 22 functions to provide the desired anti-back flow characteristics.

The foregoing oil filter structure is old in the art, and is described herein for illustrative purposes only, it being apparent that the housing and inlet and outlet configuration of the filter according to the present invention may readily be varied to suit the desired application.

Disposed within the interior of housing 12 is a filter element 24. As will be described in greater detail hereinafter, filter element 24 comprises an elongate filter element having a length substantially in excess of the greatest dimension of housing 12. Filter element 24 comprises a multi-media filter having an oil return path interior thereof. Filter element 24 terminates, at one end, in a mounting flange 26. Mounting flange 26 is mounted to tubular fitting 16 and provides for fluid communication between tubular fitting 16 and the oil return path interior of filter element 24. The other end of filter element 24 terminates in a pressure relief valve 28 which provides fluid communication between the interior of housing 12 and the oil return path interior of filter element 24, when the pressure in oil filter 10 exceeds a predetermined level.

As is most readily apparent from FIG. 1, filter element 24 defines a tortuous path within housing 12 in order to permit the accommodation of a filter element 24 having a length greater than the largest dimension of housing 12. Specifically, according to the preferred embodiment of the present invention, the tortuous path defined by filter element 24 comprises a generally spiral configuration.

Referring specifically to FIGS. 1 and 2, the spiral path of filter element 24 will now be described. As referred to hereinbefore, a first end of filter element 24 is mounted to tubular fitting 16 by mounting flange 26. That portion of filter element 24 adjacent the first end is directed along the axis of cylindrical housing 12 toward the integral end thereof. At the integral end of housing 12, the filter element 24 is directed radially toward the side wall of cylindrical housing 12 and thence is spiraled about the axial portion thereof, toward end disk 14. Thus, filter element 24 forms a generally spiral coil about the axially directed portion thereof, as illustrated in FIGS. 1 and 2. Pressure relief valve 28, at the other end of filter element 24, is thus disposed adjacent end disk 14. It is thus apparent that the tortuous path of filter element 24 enables the accommodation within housing 12 of a filter element 24 having a length substantially greater than the greatest dimension of housing 12.

As illustrated in FIGS. 1 and 2, spaces are preferably provided between the side walls of housing 12 and filter element 24 and between the spiral portion of filter element 24 and the axial portion thereof. These spaces, which have been somewhat exaggerated in the drawings for the purposes of illustration, function to provide paths for inlet oil flow within the housing 12. Thus, the path of the oil in housing 12, as is generally illustrated by the arrows in FIG. 1, flows to virtually all areas of the interior of housing 12. Thus, oil will impinge upon the exterior of filter element 24 substantially over the entire surface thereof.

Referring specifically to FIGS. 3-6, filter element 24 will now be described in greater detail. As briefly referred to hereinbefore, filter element 24 preferably comprises a flexible, elongate, generally cylindrical filter element. An oil return path or channel is provided interior of filter element 24, in the form of a flexible foraminous tube 30. According to the preferred embodiment of the present invention, as depicted in the drawings, tube 30 preferably comprises a metal coil spring. Coil spring 30 functions as a resilient core and oil return passage for the filter element 24. Oil readily flows through the intercoil spaces in coil 30, to permit oil to enter the interior thereof, and thence to exit the oil filter 10.

A migration barrier 32 is disposed about the coil 30. Migration barrier 32 typically comprises a fabric or cloth layer disposed about coil 30. Migration barrier 32 fulfills two functions: first, migration barrier 32 functions as a final filtering medium; and second, migration barrier 32 prevents entry of any part of the principal filtering medium into the interior of coil 30. A substantial layer of the principal filtering medium 34 is disposed about migration barrier 32. According to the present invention, the principal filtering medium preferably comprises material commonly referred to as fibrous cotton. Specifically, fibrous cotton comprises a mixture, principally of cotton with a lesser amount of cellulose fibers. Such material provides a highly effective filtering medium and is relatively inexpensive and readily available.

An outer fabric cover 36 is disposed about the principal filtering medium 34. Fabric cover 36 provides two functions; first, fabric cover 36 encloses the principal filtering medium 34 to provide for the integrity of the filtering element 24; and second, fabric cover 36 functions as an additional filtering medium.

Accordingly, the filtering element 24 according to the present invention comprises a three density filtering media. Moreover, the filtering element 24 thus described is flexible, thereby readily permitting the tortuous path heretofore described.

Referring now to FIG. 5, pressure relief valve 28, briefly referred to hereinbefore, will now be described in greater detail. Pressure relief valve 28 comprises a disk substantially sealing the end of filter element 24 and having a central aperture therein. The aperture communicates with the interior of a spring housing 38 mounted centrally on disk 28 within the interior of coil 30. Spring housing 38 includes openings to the interior of coil 30, so that oil flowing through the aperture in disk 28 will pass into the interior of coil 30 and thence exit the oil filter 10. Disposed within spring housing 38, beneath the central aperture in disk 28 is a disk or seal 40. A spring 42 is contained within spring housing 38 and urges seal 40 into pressure sealing engagement with the aperture in disk 28. Thus, seal 40 will normally be sealed against the aperture in disk 28. Should the oil pressure within housing 12 exceed the urging of spring 38, seal 40 will be urged away from the aperture in disk 28, thereby permitting oil to flow through the aperture and to thereby exit the oil filter. Thus, the relief pressure of pressure relief valve 28 is determined by the spring 42. According to the preferred embodiment of the present invention, spring 38 will yield when the oil pressure exceeds eight pounds per square inch, in accordance with conventional oil filter design.

Referring now to FIG. 6, mounting flange 26 will now be described in detail. Specifically, mounting flange 26 is generally disk-shaped and functions to seal the other end of the filtering medium. Mounting flange 26 includes a cylindrical recess 44 which engages over tubular fitting 16 to mount the filter element 24 thereto. Mounting flange 26 includes a central aperture communicating with a tubular portion 46 dimensioned to be received interior of coil 30. Thus, mounting flange 26 engages the interior of coil 30 to securely mount coil 30 of filter element 24, while providing for fluid communication between the interior of coil 30 and tubular fitting 16.

The oil filter constructed in accordance with the preferred embodiment of the present invention thus described has demonstrated excellent filtering efficiency and capacity. Specifically, applicants have constructed an oil filter in a housing of conventional size employing a filtering element 24 of approximately twenty inches in length. An SAE modified lube oil filter performance test conducted on this oil filter resulted in a filter efficiency of 92% and a computed capacity of 369 grams of solids and six ounces of moisture. These tests were conducted employing standard contaminant SOFTC–2B at 180° F. for sixty-six hours at six gallons per minute flow. Accordingly, the oil filter according to the present invention has demonstrated desirable high efficiency and capacity.

While a particular embodiment of the present invention has been shown and described in detail, it is apparent that adaptations and modifications will occur to those skilled in the art. Specifically, the oil filter according to the present invention may readily be embodied in a cartridge for an oil filter assembly having its own housing for removably receiving an oil filtering body. Moreover, the filter according to the present invention need not be employed as an oil filter, but may readily be adapted for other filtering applications. Accordingly, such modifications are within the spirit and scope of the present invention, as set forth in the claims.

What is claimed is:

1. A filter comprising a cylindrical housing having one integral end wall, an end disk mounted to the open end of said housing, said end disk having an outlet disposed at the center of said end disk and at least one inlet disposed about the periphery of the outlet, and an elongate filter element having a length greater than the length of said housing, said filter element having a return path interior thereof, said filter element being disposed within said housing along a tortuous path with said return path communicating with said outlet, said tortuous path comprising a first portion at the end of said filter element adjacent said outlet directed axially with respect to said housing and a second portion defining a spiral configuration closely wound about said first portion so that said filter element substantially fills the interior of the cylindrical housing to maximize the filter surface available in said housing.

2. Apparatus according to claim 1 wherein said filter element comprises a flexible foraminous tube defining said return path, a migration barrier disposed about said tube, a substantial layer of principal filtering medium disposed about said migration barrier and a foraminous outer covering disposed about said principal filtering medium.

3. Apparatus according to claim 2 wherein said resilient foraminous tube comprises a resilient metal coil.

4. Apparatus according to claim 2 wherein said principal filtering medium comprises fibrous cotton.

5. Apparatus according to claim 2 wherein said foraminous outer covering comprises a cloth layer.

6. An oil filter for internal combustion engines comprising a cylindrical housing having one integral end wall, an end disk enclosing the other end of said housing, said end disk including a central tubular outlet fitting internally threaded for engagement on said engine and an annular seal for abutting engagement with said engine defining an inlet region between said seal and said fitting, said inlet region including a plurality of inlet openings, and an elongate filter element having a length greater than the length of said housing, said filter element having an oil return path interior thereof, said filter element being disposed within said housing along a tortuous path with said oil return path communicating with said tubular fitting at one end, said tortuous path comprising a first portion directed axially with respect to said housing from said tubular fitting towards said integral end wall and a second portion tightly spirally wound about said first portion to substantially fill the cylindrical housing with said filter element to maximize the filter surface available in said cylindrical housing, said filter element comprising a flexible foraminous tube defining said oil return path, a migration barrier disposed about said tube, a substantial layer of principal filtering medium disposed about said migration barrier and a fabric cover disposed about said principal filtering medium.

7. Apparatus according to claim 6 wherein said tube comprises a resilient metal coil.

8. Apparatus according to claim 6 wherein said principal filtering medium comprises a fibrous cotton.

9. Apparatus according to claim 6 wherein said foraminous outer covering comprises a cloth layer.

References Cited

UNITED STATES PATENTS

| | | | |
|---|---|---|---|
| 3,315,808 | 4/1967 | Hopkins | 210—440 X |
| 2,715,097 | 8/1955 | Guarino | 210—321 |
| 1,825,983 | 10/1931 | Sweetland | 210—440 |
| 2,448,212 | 8/1948 | Dewey | 210—130 |

FOREIGN PATENTS

| | | | |
|---|---|---|---|
| 627,524 | 6/1927 | France | 210—457 |

FRANK A. SPEAR, Jr., Primary Examiner

U.S. Cl. X.R.

210—497.1